(12) United States Patent
Lee, Jr. et al.

(10) Patent No.: US 6,903,310 B1
(45) Date of Patent: Jun. 7, 2005

(54) INDEPENDENT CONTROL OF A FLAVOR ENHANCEMENT CHAMBER AND A FOOD PREPARATION CHAMBER FOR A FOOD PREPARATION DEVICE

(75) Inventors: Maurice W. Lee, Jr., Boley, OK (US); Maurice W. Lee, III, Oklahoma City, OK (US)

(73) Assignee: Electra Wave Corporation, Boley, OK (US)

( * ) Notice: Subject to any disclaimer, the term of this patent is extended or adjusted under 35 U.S.C. 154(b) by 155 days.

(21) Appl. No.: 10/427,668

(22) Filed: Apr. 30, 2003

(51) Int. Cl.⁷ .............................................. H05B 1/02
(52) U.S. Cl. .................................... 219/490; 219/492
(58) Field of Search .............................. 219/389, 400, 219/401, 429, 431–433, 438–441, 472, 474, 494, 497, 490–492; 99/340, 416, 417, 337, 348, 413, 419; 426/233, 438, 510, 516; 366/220, 231; 137/493.7, 512

(56) References Cited

U.S. PATENT DOCUMENTS

| | | | | |
|---|---|---|---|---|
| 4,173,925 A | * | 11/1979 | Leon | ........................... 99/348 |
| 4,469,020 A | | 9/1984 | Hamilton et al. | |
| 4,957,039 A | | 9/1990 | Reyes | |
| 5,092,229 A | * | 3/1992 | Chen | ........................... 99/337 |
| 5,229,563 A | | 7/1993 | Isogai et al. | |
| 5,380,986 A | | 1/1995 | Mullen | |
| 5,567,458 A | * | 10/1996 | Wu | ........................... 219/494 |
| 5,713,267 A | | 2/1998 | Wilson | |
| 5,782,165 A | * | 7/1998 | Glenboski et al. | ........................... 99/340 |
| 5,928,546 A | | 7/1999 | Kramer et al. | |
| 5,993,878 A | | 11/1999 | Tippmann | |
| 6,152,024 A | | 11/2000 | Tippmann | |
| 6,173,643 B1 | | 1/2001 | Qian et al. | |
| 6,202,637 B1 | | 3/2001 | Roberts | |
| 6,283,014 B1 | | 9/2001 | Ng et al. | |
| 6,319,527 B1 | | 11/2001 | Purser | |
| 6,432,460 B1 | | 8/2002 | Zietlow et al. | |
| 2003/0054086 A1 | | 3/2003 | Murphy | |
| 2003/0070559 A1 | | 4/2003 | Victor | |

* cited by examiner

*Primary Examiner*—Tu Hoang
(74) *Attorney, Agent, or Firm*—Fellers, Snider, et al.; Daniel P. Dooley (57) ABSTRACT

A combination for preparing a food product and method of using the combination are disclosed. The combination includes a housing supporting a cooking chamber, which communicates with a flavor enhancement chamber. The cooking chamber and the flavor enhancement chamber are selectively and independently controlled by an automated controller. In using the combination, a user provides the food product, places a flavor enhancement substance within the flavor enhancement chamber, arranges the food product on a preparation rack, and position the rack with the food within the cooking chamber. With the food positioned within the combination, the user programs parameters for a food preparation cycle into an operating code resident in the automated controller. Upon activation by the user, the controller executes the operating code. In response, the flavor enhancement chamber releases a flavor enhancement for impregnation into the food product, and the cooking chamber completes preparation of the food product.

20 Claims, 6 Drawing Sheets

INDEPENDENT CONTROL OF A FLAVOR ENHANCEMENT CHAMBER AND A FOOD PREPARATION CHAMBER FOR A FOOD PREPARATION DEVICE

FIELD OF THE INVENTION

This invention relates generally to the field of food preparation devices, and more particularly, but not by way of limitation, to selective control of a flavor enhancement chamber of a food preparation device independently from a cooking chamber of the food preparation device.

BACKGROUND

Food preparation devices are used for the preparation of a wide assortment of food product. Among the types of food product, preparation devices are devices useful in adding an enhanced flavor to the food product, such as devices focused on impregnating the food product with a smoke flavor and other aromatic flavors.

The food preparation device market continues to place pressure on the industry for food preparation devices with improved response times, easy operating capabilities, an ability for application to a range of food products, efficient cleaning features, and service reliability in addition to having a compact form factor.

As such, challenges remain and a need persists for a compact food preparation device with an ability to impregnate a food product with an enhanced flavor selectively independent from an exposure of the food product to an alternate energy source during preparation of the food product.

SUMMARY OF THE INVENTION

In accordance with preferred embodiments, a method and a combination are provided for imparting an enhancement flavor into a food product. The food preparation combination includes a housing supporting a cooking chamber, which communicates with a flavor enhancement chamber. The cooking chamber and the flavor enhancement chamber are selectively controlled independent from one another by an automated controller during execution of a programmed food preparation cycle.

In preparing a food product using the combination, a user provides the food product in a pre-preparation state (i.e., cleaned, seasoned, trimmed and so forth), places a flavor enhancement substance within the flavor enhancement chamber, arranges the food product on a food support member, and positions the food support member supporting the food product within the cooking chamber.

With the food positioned within the combination, the user selects a preparation mode, such as steam, pressure, warm or brown (or a combination thereof) and determines whether or not and when a flavor enhancement mode should be included within a preparation cycle for the food product. The user assigns a flavor enhancement time period independent from the preparation mode time period for an impregnation of the food product with a flavor enhancement. The combination generates the flavor enhancement while cycling through a programmed food preparation cycle.

The user programs operating parameters into an operating code (programmed into the controller) by using a control panel communicating with the controller. Upon activation by the user, the controller executes the operating code based on the parameters provided by the user. In response to the operating code execution, the flavor enhancement chamber prepares the food product by releasing the flavor enhancement for impregnation into the food product, and the cooking chamber further prepares the food product by cycling through the preparation mode.

These and various other features and advantages that characterize the claimed invention will be apparent upon reading the following detailed description and upon review of the associated drawings.

DETAILED DESCRIPTION

Figure 1:
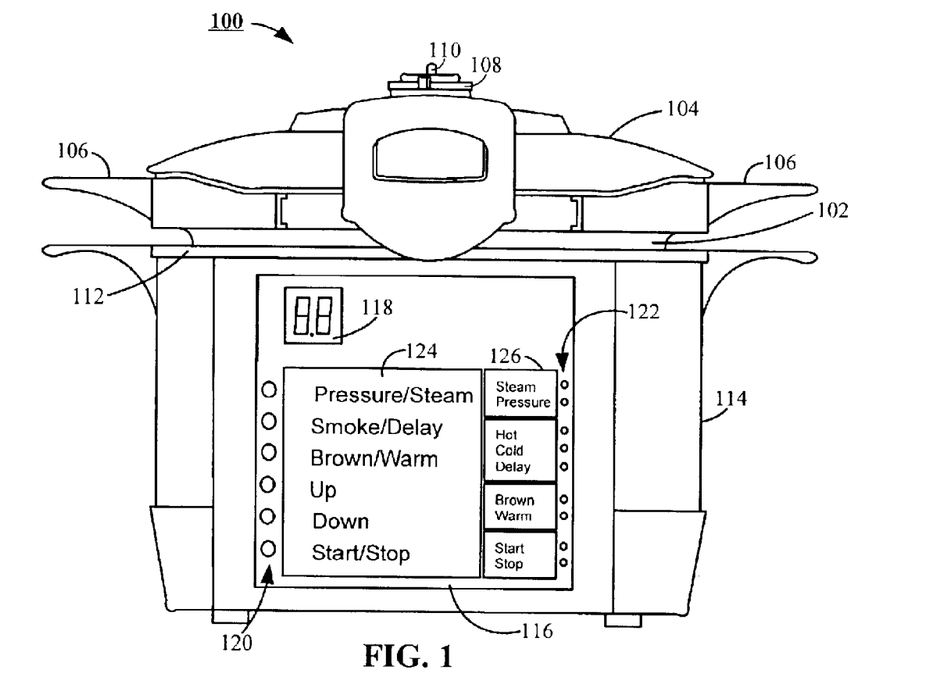
FIG. 1 is an elevational view of a food preparation and flavor enhancement combination.

Referring now to the drawings, FIG. 1 provides an elevational front view of a food preparation device (device) 100, which combines a cooking chamber 102, and a flavor enhancement chamber (not shown separately) for preparation of food products. The flavor enhancement chamber interacts with the cooking chamber to facilitate a range of selectable, programmable, alternate food preparation modes. Each food preparation mode may be selected for standalone operation, constituting a preparation cycle, or the modes may be sequentially combined to deliver the desired preparation cycle.

Among the available preparation modes are a variable delayed timing mode (DT), cold mode (CM), hot mode (either pressure mode (PM) or steam mode (SM)), warm mode (WM), browning mode (BR) and a flavor enhancement mode (FE). With the exception of DT and BR, FE is available either prior to, in conjunction with or subsequent to each of the other food preparation modes. DT may be selectively activated at the start of the preparation cycle, or selectively inserted between a series of desired preparation modes which combine to form the preparation cycle.

In a preferred embodiment, as shown by FIG. 1, a cover 104 supports a pair of latching handles 106 that interact with the cooking chamber 102 to sustain an environment of the cooking chamber 102. The cover 104 includes a mode regulation member 108, used to regulate the environment within the cooking chamber 102, and a pressure present member 110, which indicates when a pressure within the cooking chamber 102 is greater than an atmospheric pressure external the cooking chamber 102.

The preferred embodiment of FIG. 1 further shows a housing 112, supporting a shell 114, which provides a thermal insulation cavity (not separately shown) circumventing the housing 112. The shell 114 in conjunction with the housing 112 further supports a control panel 116, used to program the desired preparation cycle into the device 100, and to provide a status of the preparation cycle, as the device 100 progresses through the programmed preparation cycle.

In a preferred embodiment, the control panel 116 features a numeric display 118, a plurality of mode selection devices 120, a plurality of status indicators 122, a mode identification template 124 and a status identification template 126. The numeric display 118 is useful during programming of the preparation cycle for displaying selected cycle times for each selected preparation mode programmed into the preparation cycle. The numeric display 118 is also useful for displaying each DT elected for insertion into the preparation cycle either preceding programming of a desired preparation mode or following the programming of the preparation mode.

In preferred embodiments of the present invention, each of the plurality of mode selection devices 120 are mode selection switches (MSS) 120. The MSS 120 are useful in programming a desired preparation cycle into the device 100. That is useful when used in combination with the mode identification template 124. Additionally in preferred embodiments, each of the plurality of status indicators 122 are status light emitting diode indicators (LEDs) 122. In combination with the status identification template 126, the LEDs 122 are useful in providing information about which mode is currently being programmed into the preparation cycle. The LEDs 122 in combination with the numeric display 118 also provide knowledge of which preparation mode of the preparation cycle the device 100 is engaged in during execution of the programmed preparation cycle, and the remaining time for completion of that engagement.

Figure 2:
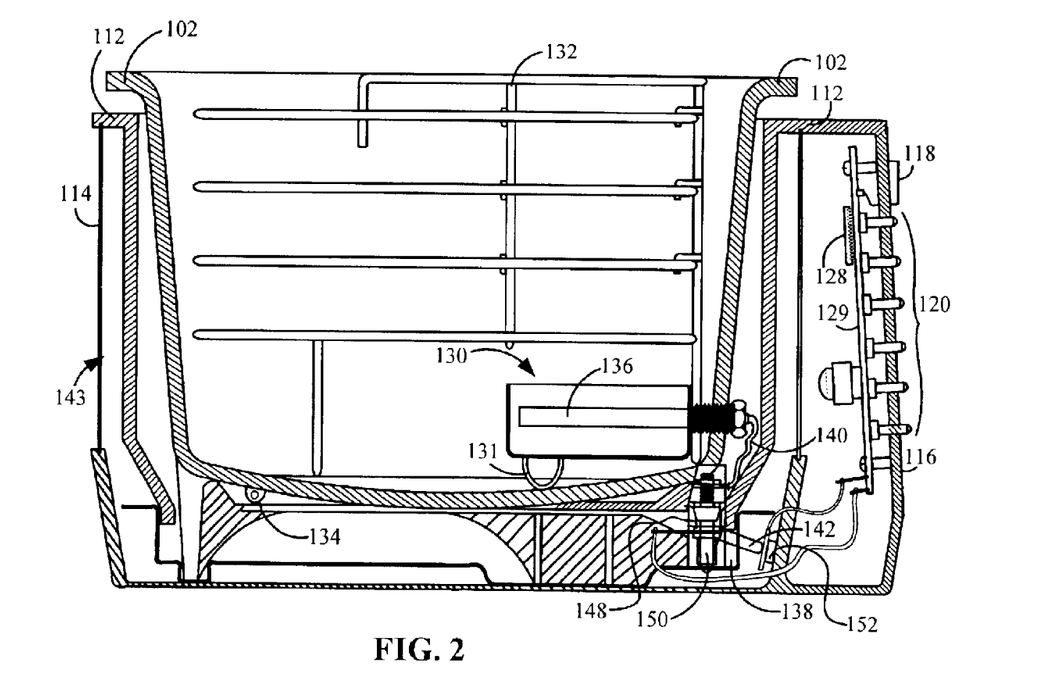
FIG. 2 is a cross-sectional, elevational view of the food preparation and flavor enhancement combination of FIG. 1.

Turning to FIG. 2, shown therein is a device controller (controller) 128 supported by a printed circuit board assembly 129, a flavor enhancement chamber 130 supported by an enhancement chamber support 131, a modular food preparation rack 132, a food preparation element (FPE) 134 adjacent the cooking chamber 102, a flavor enhancement element (FEE) 136 confined by the flavor enhancement chamber 130, an energy transfer member 150 providing energy to the FEE 136 through a FEE energy transfer conduit 140, and a separate energy transfer member 142 providing energy to the FPE 134.

In a preferred embodiment, the shell 114 is offset from the housing 112 to provide a thermal insulation cavity 143 circumventing the housing 112. The energy provided is electrical, both the FPE 134 and the FEE 136 are resistive heating elements (in which the FPE 134 preferably provides a delivery capacity of substantially 1200 watts of power and the FEE 136 preferably provides a delivery capacity of substantially 100 watts of power). A Zilog® Z86E0812PSC microprocessor has been found to be useful as a controller 128, and the FPE energy transfer member 142 is a pair of FPE energy transfer members 142 shown by FIG. 2.

Figure 3:
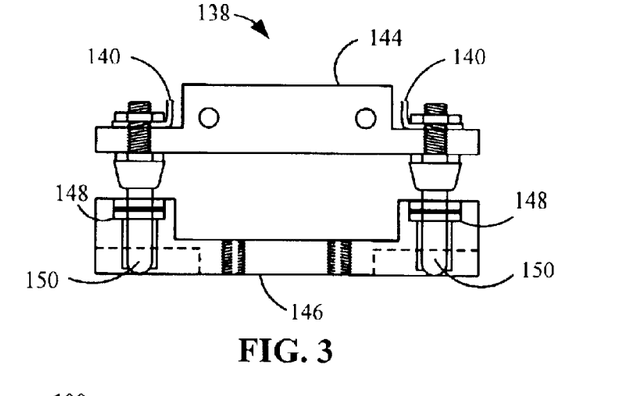
FIG. 3 is an elevational view of an energy transfer member of the combination of FIG. 1.

As shown by FIG. 3, in view of FIG. 2, in a preferred embodiment, the energy transfer member 138 includes a top portion 144 and a bottom portion 146.

The top portion 144 is secured to the cooking chamber 102 (of FIG. 1), while the bottom portion 146 is secured to the housing 112 (of FIG. 1), and the FEE contact terminals 150 slidingly engage a pair of FEE power bushings 148. This arrangement provides for removal of the cooking chamber 102 (also shown in FIG. 2) with the flavor enhancement chamber 130 from the housing 112 for ease of cleaning.

Figure 4:
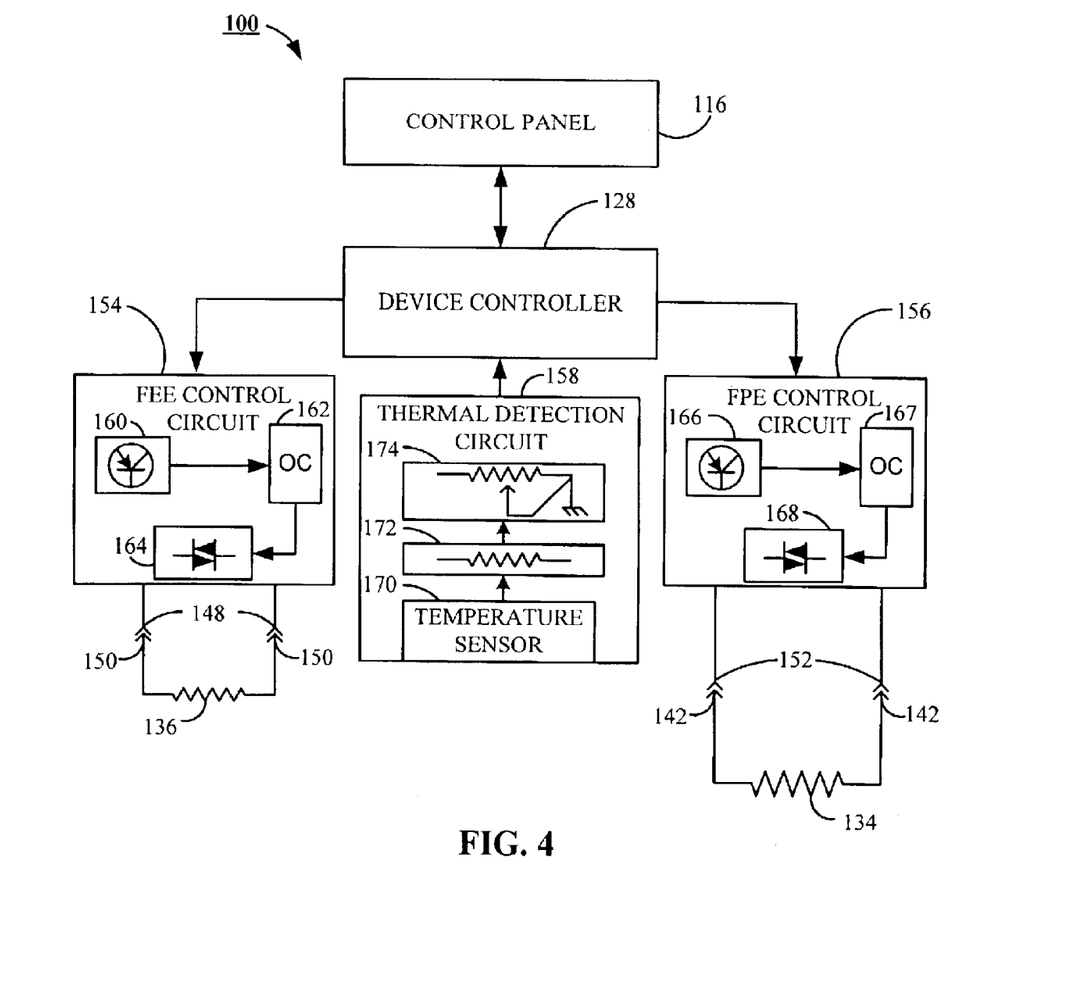
FIG. 4 is a functional block diagram of a circuit for controlling operation of the food preparation and flavor enhancement combination of FIG. 1.

Substantially similar to the pair of FEE contact terminals 150 and FEE power bushings 148 of FIG. 3, FIG. 4 shows a preferred embodiment of a pair of FPE contact terminals 142 slidingly engaged with a pair of FPE power bushings 152 (also shown in FIG. 2). Sliding engagement of each FPE contact terminal 142 with its mating FPE power bushing 152 promotes removal of the cooking chamber 102 (of FIG. 2), from the housing 112 (of FIG. 2) for ease of cleaning.

The control panel 116 incorporates bidirectional communication with the controller 128. The controller 128 communicates with a FEE control circuit 154 and provides high level control for the FEE 136, while the FEE control circuit 154 provides direct operational control over the FEE 136. The FPE 134 is controlled in substantially the same manner. That is, the controller 128 communicates with a FPE control circuit 156 to provide high level control of the FPE 134, while the FEE control circuit 154 provides direct operational control over the FEE 136.

In addition to individually controlling the FPE 134 and the FEE 136, the controller 128 controls the operational response of the numeric display 118, the MSS 120 and the LEDs 122 during programming and execution of the programmed preparation cycle.

During execution of the programmed preparation cycle, the controller 128 provides all timing and sequencing functions, receives operating temperature conditions from a thermal detection circuit 158, and issues operating instructions to the FEE control circuit 154 and the FPE control circuit 156 in response to the temperature status received.

In a preferred embodiment, the FEE control circuit 154, includes a first transistor 160, responsive to the controller 128. The transistor 160 relays an instruction received from the controller 128 to an optocoupler 162, which drives a FEE triac 164 that supplies power to the FEE 136. The FPE control circuit 156 includes a second transistor 166, responsive to the controller 128, which relays instructions from the controller 128 to a second optocoupler 167. The optocoupler 167 drives a FPE triac 168 that supplies power to the FPE 134.

Also in a preferred embodiment, the controller 128 uses a ramp technique to measure the temperature. The current from a temperature sensor 170 causes voltage drops across a fixed resistor 172 and a potentiometer (POT) 174. As the temperature rises, the current increases, which increases an output voltage of the POT 174. The controller 128 includes a voltage comparator (not separately shown) that compares the voltage output from the POT 174 to an elapse time dependent, inter generated voltage reference. The reference voltage corresponds to the portion of the programmed preparation cycle being executed at that time.

When the reference voltage is substantially equal to the output voltage of the POT 174, or time has expired for that portion of the programmed preparation cycle, the controller 128 issues an interrupt command to the appropriate control circuit (either FEE control circuit 154, or the FPE control circuit 156) to halt the supply of power to the appropriate element (either 134, or 136). Preferably, the FEE 136 operates for the programmed time and is not interrupted by the controller 128 based on input from the thermal detection circuit 158.

To enhance an understanding of a preferred embodiment, but not by way of imposing limitations on the present invention, an overview of a preferred embodiment of a use for the present invention is disclosed with reference to FIGS. 1, 2 and 4. This particular use embodiment is for illustrative purposes only, does not restrict use, impose or inherently impose limitations on use of the present invention, nor does it encompass all available preparation cycle variants. It is noted that the present invention may be used in preparing preconditioned food product, without activating the FEE 136, i.e., in the absence of the FE. For the illustrative examples given below, operation of the device 100 will be described for use in those situations in which flavor enhancement of the food product is desired.

For the following illustrative disclosure examples (one of a plurality of uses for the present invention), wood chips or other flavoring substances are introduced into the flavor enhancement chamber for use in impregnating the food product with an enhanced flavor, in particular a smoke flavor. It is noted that in addition to a broad array of varietal woods from which wood chips may be selected, alternate flavor enhancement substances such as herbs, spices, extracts, wines or spirits (to name a few) may be selected by the user for introduction into the flavor enhancement chamber 130.

Exposure of a flavor enhancement substance to the FEE 136, the FEE 136 is energized, releases an aromatic flavor enhancement into the cooking chamber 102 for impregnation into the preconditioned food product.

A user may elect to operate the device 100 in CM (for the present illustrative operating embodiment CM is given to mean a "cold" smoke mode). In CM, the FPE 134 is suspended from operating during the preparation cycle. Flavor enhancement of the food product may be then carried out in the absence of pressure or steam. The food product is exposed to smoke generated by the wood chips contacting the energized FEE 136. The device 100 promotes impregnation of a smoke flavor into the food product, which may be cooked at a later time, either by the device 100 or by alternate means. For example, steaks or fish or other food may be cold smoked and then charbroiled on a grill. Alternatively, cheeses, nuts and other foods may be cold smoked for consumption.

The user may alternatively select impregnating the food product with a smoke flavor using the PM, SM, WM or any sequential combination of the CM, PM, SM and WM. Election of the PM with FE involves use of the flavor enhancement chamber 130 in conjunction with the cooking chamber 102 operating as a pressure cooker. Pressure cooking involves putting the food product in a sealed container with a small amount of water and applying heat. This confines the food product in a sealed pressure vessel that prevents the juices and flavor of the food from escaping into the environment.

To place and operate the device 100 in a PM with FE, preferably a small amount of water is placed in the bottom of the cooking chamber 102. Flavor enhancers are positioned within the flavor enhancement chamber 130 in proximity with the FEE 136. A configuration of the modular food preparation rack 132 is selected to accommodate the food product and placed in the cooking chamber 102, and the food product is positioned on the modular food preparation rack 132. Alternately, the food product may be positioned on the rack 132 and then placed in the cooking chamber 102.

Following placement of the food product into the cooking chamber, the cover 104 is positioned on and latched to the cooking chamber 102. Next, the mode regulation member 108 is set to pressure (closed). During operation of the device 100 operating in PM in conjunction with FE, pressure within the cooking chamber 102 rises above atmospheric pressure and the temperature will be increased above 212° F. while the food product is cooking. The pressure is controlled indirectly by controlling the temperature of the pressurized cooking chamber 102. Since most foods contain a great deal of water, the pressure in the pressure vessel is pre-set to a temperature value using the saturated steam pressure tables.

In PM with FE, the sealed cooking chamber 102 traps the smoke produced by the FEE 136; thus, pressuring the smoke into the food product being cooked. This is a favorite method of barbequing ribs, beef, chicken, lamb, vegetables, and many other food products, limited only by the imagination of the user.

SM involves surrounding the food product with steam. Preferably, a small amount of water is placed in the cooker, and heat from the FPE 134 boils the water. In operating the device in SM in conjunction with FE, a small amount of water is placed in the bottom of the cooking chamber 102, flavor enhancers are positioned in proximity with the FEE 136, the modular food preparation rack 132 is configured, the food product is placed on the modular food preparation rack 132 and positioned within the cooking chamber 102, the cover 104 is positioned and secured and the mode regulation member 108 is set to steam (open). It is noted that, following configuration of the modular food preparation rack 132, the modular food preparation rack 132 may be placed within the cooking chamber 102, with the food product subsequently positioned on the modular food preparation rack 132, prior to securing the cover 104 to the cooking chamber 102.

Pressure within the cooking chamber 102 is kept at atmospheric pressure. The steam transfers the heat from the FPE 134 to the food, thereby, cooking it. It is recommended that when operating SM concurrently with FE, the device 100 be used under an exhaust fan because it tends to release the aromatic flavor enhancement (in this instance smoke) into the kitchen.

As noted above, FE may be used in CM preceding either the PM or SM, concurrent with the SM or PM, or subsequent to SM or PM. It is also noted that FE may be selectively operative in the CM, PM, SM and WM, or may be active during any or all preparation modes used collectively in a preparation cycle.

BR is a separate single mode, preparation cycle that runs alone and preferably is not programmed for use in conjunction with other available preparation modes. In a preferred embodiment, BR allows up to 20 minutes of time, where full power is applied to the FPE 134. The user places the food product into the interior bottom portion of the cooking chamber 102. The cover 104 is left off while the food product browns. After the device 100 times out, the preparation cycle is stopped and a stop LED of the status LEDs 122 is activated. Preferably, during BR, the device 100 is attended by the user to monitor progress of the BR preparation cycle and prevent burning of the food product.

WM is, also, preferably a separate single mode, preparation cycle, but may be programmed to subsequently follow a CM, PM or SM. FE may precede WM or operating in conjunction with WM for preparation of food products such as nuts. In a preferred embodiment, WM will hold the foods warm for serving up to 99 minutes after the cooking process has ended.

WM time is preferably set after other cooking modes are finished, particularly in PM. Preferably, PM should be completely released before WM is set. Otherwise, the device 100 will continue cooking while under pressure and overcook the food while operating in WM.

WM is preferably intended to hold foods warm after being fully cooked in the device 100. Use of WM is not recommend for re-warming food products from a refrigerated state. Risk from food poisoning may result from a possible growth of bacteria during the re-warming process.

In a preferred embodiment, to enable a preparation mode during programming of the preparation cycle, a time value is assigned to the preparation mode. Any preparation mode with an accompanying zero time set is skipped during execution of a programmed preparation cycle, with the exception of a hot preparation mode selection, either SM or PM, in which the HM time period defaults to the selected FE time period.

If desired, DT is the first time set during preparation cycle programming, and the first time checked when the unit is started. In a preferred embodiment, DT allows the controller 128 to delay the time the device 100 starts a first operative preparation mode, such as CM, by up to 99 minutes. During DT, neither FE nor cooking of the food product is taking place. If the user wishes to do so, DT may be used as a timer, for a period up to the maximum capabilities of the DT, which in a preferred embodiment is 99 minutes.

CM flavor enhancement is the second time set by the user during preparation cycle programming, and the second time checked by the controller 128 during execution of the preparation cycle. During CM, the FEE 136 is activated and the FPE 134 is suspended from operation. In a stand-alone mode, CM is used to impregnate the food product with an enhanced flavor, such as a smoky flavor, without cooking the food product.

Selectively, PM or SM is the third time set by the user during preparation cycle programming, and the third time checked by the controller 128 during execution of the preparation cycle. During PM or SM execution, FPE 134 is controlled to hold the temperature and, therefore, the pressure constant. For those instances that FE is operative concurrent with either PM or SM, the FEE 136 is operative at the same time the FPE 134 is operative.

In a preferred embodiment, the food product being steamed or pressure-cooked is flavored, at the same time, with aromatic vapors, including smoke, created by flavor enhancers within the flavor enhancement chamber 130 proximate FEE 136. If FE time is not zero, the controller 128 instructs the FEE control circuit to apply power to the FEE 136 to produce the desired flavor enhancement for impregnation into the food product. In a preferred embodiment, the flavor enhancement time is set for a time span of either less than or equal to the time assigned to the selected PM or SM of the programmed preparation cycle.

Any of the above modes, DT, CM, PM or SM, and FE may be set to operate one subsequent to the other. For example: In a preferred mode, by using DT, the user can delay continuance of the preparation cycle for up to 99 minutes. When DT expires, the device 100 will continue automatically to the next preparation mode, for example CM, which may incorporate an activation time of up to 99 minutes. Upon expiration of CM, the controller 128 proceeds with execution of the next preparation mode programmed into the preparation cycle.

The next preparation mode may be selectively nothing, PM or SM. If selected, the next selected preparation mode may have a programmed execution time of up to 99 minutes. While the food product is under pressure or is steaming, FE may be concurrently operative with selected preparation mode, for a time up to the amount of time set for the selected PM or SM.

When more than one preparation mode is programmed in sequence, an LED, of the status LEDs 122, associated with the active preparation mode will be on solid and the modes LEDs 122 associated with the preparation modes to follow will blink. The time for any inactive preparation mode, whose time has not expired, may be displayed by pressing its corresponding MSS 120.

When the controller 128 completes execution of the preparation cycle, the controller 128 stops all modes and signals the user. The controller 128 issues: an instruction to the FEE control circuit 154 to discontinue power to the FEE 136, an instruction to the FPE control circuit 156 to discontinue providing power to the FPE 134, a signal to activate an LED of the plurality of status LEDs 122 associated with the stop status, and a signal to a beeper (not separately shown) to issue a beep or beeps to indicate the programmed preparation cycle is complete.

In a preferred embodiment, during execution of the programmed preparation cycle, a decimal point of the numeric display 118 is used to indicate the operational state of the device 100. When the device 100 is stopped, the decimal point will be off. The decimal point will flash once a second when the controller 128 is executing a programmed preparation cycle. However, in PM or SM, the controller 128 does not activate the time shown by numeric display 118, or commence timing of the selected preparation mode until the temperature within the cooking chamber 102 is greater than substantially 200° F., or the FPE 134 has been warming for substantially a 10 minute period, whichever point is reached first. The decimal point LED will start flashing after this temperature or time is reached indicating the controller is executing the selected preparation mode.

When the device 100 is initially activated, the numeric display 118 comes on. An operational code of the device 100, programmed into the controller 128, clears all flags, pre-selects preparation operating modes parameters for PM, FE (for operation in the hot mode) and BR (pre-setting brown time for 20 minutes), instructs the numeric display 118 to show two dashes (i.e."- -"), turn the decimal point off, and activates the LED associated with "Stop" of the status identification template 126. A user pressing the start button starts an execution of any preparation mode. During execution of any preparation mode, including DT, the operational code halts activation of the LED associated with "Stop", and activates the LED associated with "Start" of the status identification template 126.

In a preferred embodiment, the user may only adjust the times when the "Stop" LED is lit and a selected MSS 120 has been activated. Upon activation of the selected MSS 120, the controller 128 activates the LED of the status template associated with the selected preparation mode. Successive activation of the selected MSS 120 corresponding to the selected mode will cause the LEDs to toggle and illuminate to the second mode LED. For example: pressing the "Pressure/Steam" MSS 120 twice will cause the "Pressure" LED to go out and the "Steam" LED to illuminate, thereby allowing the "Steam" time to be set. This works correspondingly with the "Hot/Cold/Delay" and "Brown/Warm" LEDs.

In a preferred embodiment, the controller 128 keeps track of 6 different times. A description of a preferred method of setting and using these times is provided by the following narrative to enhance an understanding of the present invention, without imposing or importing limitations on the present invention.

Setting an activation time for PM or SM will be discussed first. With the "Stop" LED of the status identification template 126 lit, the MSS 120 associated with the "Pressure/

Steam" of the mode identification template 124 is used to set whether the controller 128 will proceed with an execution of the PM or SM operating parameters. The user should set the regulation member 108, on the cover 104 to match the preparation mode selected. The regulation member 108 is set to an open position when the preparation mode selected is SM, and to a closed position when the selected preparation mode is PM.

If the status identification template 126 is not currently displaying either the "Steam" LED or the "Pressure" LED, activating the "Pressure/Steam" MSS 120 will deactivate the "Hot", "Cold", "Delay", "Brown" and "Warm" LEDs of the status identification template 126, and turn on either the "Steam" LED or "Pressure" LED. Repeated activation of the "Pressure/Steam" MSS 120 will command the controller 128 to toggle between the two modes.

At the same instant, the steam or pressure time associated with the selected preparation mode will be placed in the numeric display, if any time has been set. If no time has been set, the "Up/Down" MSS 120 of the mode identification template 124 will enable the user to set a cooking time of up to 99 minutes. Since PM and SM cannot be simultaneously used, the same timer is used for either preparation mode.

In PM, the controller 128 will substantially maintain a temperature within the cooking chamber 102 at substantially 230° F., which equates to a pressure of about 7 pounds per square inch over ambient pressure, while in SM the temperature of the cooking chamber will be held hot enough to boil water at sea level. During SM, the user sets the mode regulation member 108 on the cover 104 to "Steam" (i.e. open) so the steam generated within the cooking chamber 102 can be released continually from the cooking chamber 102.

The "Up" or "Down" MSS 120 of the mode identification template 124, are used to adjust the displayed time for a particular preparation mode. There are no LEDs associated with the "Up" or "Down" MSS 120. Maintaining engagement of either the up or down MSS 120 will cause the displayed time to continue to change until released. Engaging the "Up" MSS 120 until the numeric display 118 surpasses 99 minutes will cause the numeric display 118 to reset to zero, and continue upward again. Engaging the "Down" MSS 120 until the display drops below 0 minutes will cause display to be reset to 99 minutes, where it will continue downward again.

In a preferred embodiment, operating time for FE operating in conjunction with either PM or SM cannot be set greater than the time set for the selected PM or SM cooking preparation mode. If the selected time for FE goes past the time programmed for the selected PM or SM cooking preparation mode, the display will reset to 0 minutes. If the selected time for FE goes to zero time, the numeric display 118 will be reset to the time programmed for the selected cooking preparation mode, and upon execution of the preparation cycle, FE will proceed concurrently with the selected cooking preparation mode. If either a SM or PM preparation mode is selected along with FE and an operating time has been selected for the FE but no operating time has been entered for the selected SM or PM preparation mode, the device 100 will default to the selected FE time period as the time period of the selected SM or PM preparation mode during execution of the programmed preparation cycle.

In a preferred embodiment, with safety in mind, the "Brown" mode time is preferably limited to a maximum time of 20 minutes. In a preferred embodiment of the operational code, if the time entered by the user exceeds 20 minutes, the display will reset to 0 minutes. If the time entered by the user goes below 0, the display will reset to the 20 minutes.

When the device 100 is cooking; i.e., if the "Start" LED is lit, then pressing the "Pressure/Steam" MSS 120 causes the numeric display 118 to show the prior time set for "Pressure" or "Steam" mode and its appropriate LED will light. The remaining LEDs 122, with the exception of "Start" LED, will be turned off and the "Pressure/Steam" time will be displayed and held by the numeric display 118 for 5 seconds. After that time, the numeric display 1118 will revert to the time remaining for the current preparation mode. The decimal point will be on steady while the unit warms up to the PM or SM operating temperature or the predetermined warm up time has expired. Otherwise, it will blink once a second to indicate that the device 100 is timing.

The Smoke/Delay MSS 120 is associated with the status LEDs 122 that identifying the "Hot", "Cold" and "Delay" classifications of the status identification template 126. Each classification, "Hot" "Cold" and "Delay", has a timer associated with it. The "Smoke/Delay" MSS 120 allows sequencing between these classifications, and hence, access to the timer associated with the particular preparation mode of interest. If device 100 is stopped, i.e., the "Stop" LED is lit, and none of the remaining LEDs are lit, activating the Smoke/Delay MSS 120 will cause one of these LEDs to illuminate ("Hot", "Cold" or "Delay").

The operational code will light one of the three LEDs and show, the appropriate time associated with the illuminated LED in the numeric display 118. For example; If the device 100 is displaying the "Hot" LED and the hot smoke time in the numeric display 118, pressing the Smoke/Delay MSS 120 will cause the "Cold" LED to light and the cold smoke time will be shown in the numeric display 118.

If the device 100 is displaying the "Cold" LED and time, pressing the Smoke/Delay MSS 120 will cause the "Delay" LED of the status LEDs 122 to light and the delay time will be shown in the numeric display 118. If the device 100 is displaying the "Delay" LED and time, then pressing the Smoke/Delay MSS 120 will cause the "Hot" LED to light and the hot smoke time will be displayed in the numeric display 118.

In a preferred embodiment, if the device 100 is stopped and the "Brown/Warm" MSS 120 is activated for the first time, the "Brown" LED of the status LEDs 122 illuminates and a brown time of 20 minutes will be displayed by the numeric display 118. Activating the "Brown/Warm" MSS 120 will again toggle the numeric display 118 to display a "Warm" time display, which will show as "___", until the user programs a desired time for the WM. Also, the "Warm" LED of the status LEDs 122 will illuminate alerting the user that the controller 128 is ready to receive warm time input from the user.

In a preferred embodiment, prior to setting any time associated with a preparation mode, the device 100 is placed in the "Stop" mode. From the "Stop" mode, if the desired preparation cycle has been programmed (i.e., each of the desired preparation modes have been sequenced within the preparation cycle and a mode time has been set for each desired preparation mode) pressing the "Start/Stop" MSS 120 will cause the controller 128 to execute the programmed preparation cycle by illuminating the "Start" LED and thereby initiating the first programmed preparation mode.

Figure 5:
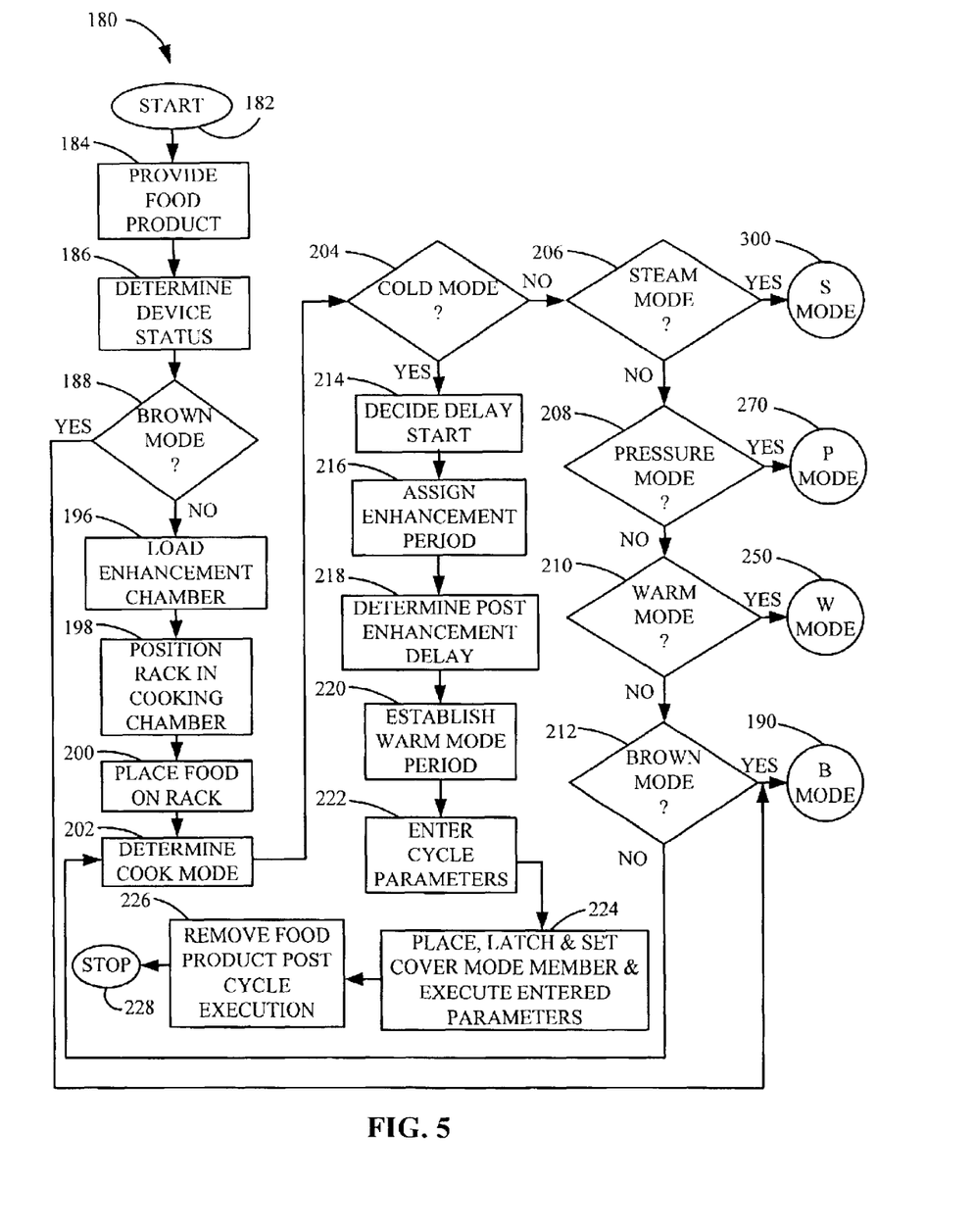
FIG. 5 is a flow chart of a method of using the food preparation and flavor enhancement combination of FIG. 1.

Turning to FIG. 5, the flow chart 180 depicts a process for using a food preparation device (such as 100). The method commences at start step 182 and proceeds to process step 184 where a food product is provided for preparation. At process step 186, status of the device is checked and the process continues at process step 188.

At process step 188, a determination is made whether to operate the device in a browning preparation mode (such as BR) or not. If the device is to be utilized in the BR, the process proceeds to flow chart 190 (to be covered during the discussion of FIG. 6). If the device is to be utilized in an alternate preparation mode, the process proceeds to process step 196. At process step 196, a food enhancement substance (such as wood chips) is deposited in a flavor enhancement chamber (such as 130).

At process step 198, a modular food preparation rack (such as 132) is positioned within a cooking chamber (such as 102) for receipt of the food product, which is placed on the modular food preparation rack at process step 200. Alternately, process step 200 may proceed process step 198. At process step 202, a determination of the preparation mode for the food product is commenced by proceeding to process step 204, where a decision is made whether or not to utilize a cold preparation mode (CM). If the CM is not selected at process step 204, the process proceeds to process step 206, where a determination is made whether or not to utilize a steam preparation mode (SM). If the SM is not selected at process step 206, the process proceeds to process step 208, where a determination is made whether or not to utilize a pressure preparation mode (PM). If the PM is not selected at process step 208, the process proceeds to process step 210, where a determination is made whether or not to utilize a warm preparation mode (WM). If the WM is not selected at process step 210, the process proceeds to process step 212, where a determination is made whether or not to utilize BR. If the BR is not selected at process step 212, the process reverts to process step 204, by passing through process step 202, and continues as such until a preparation mode has been selected.

Figure 6:
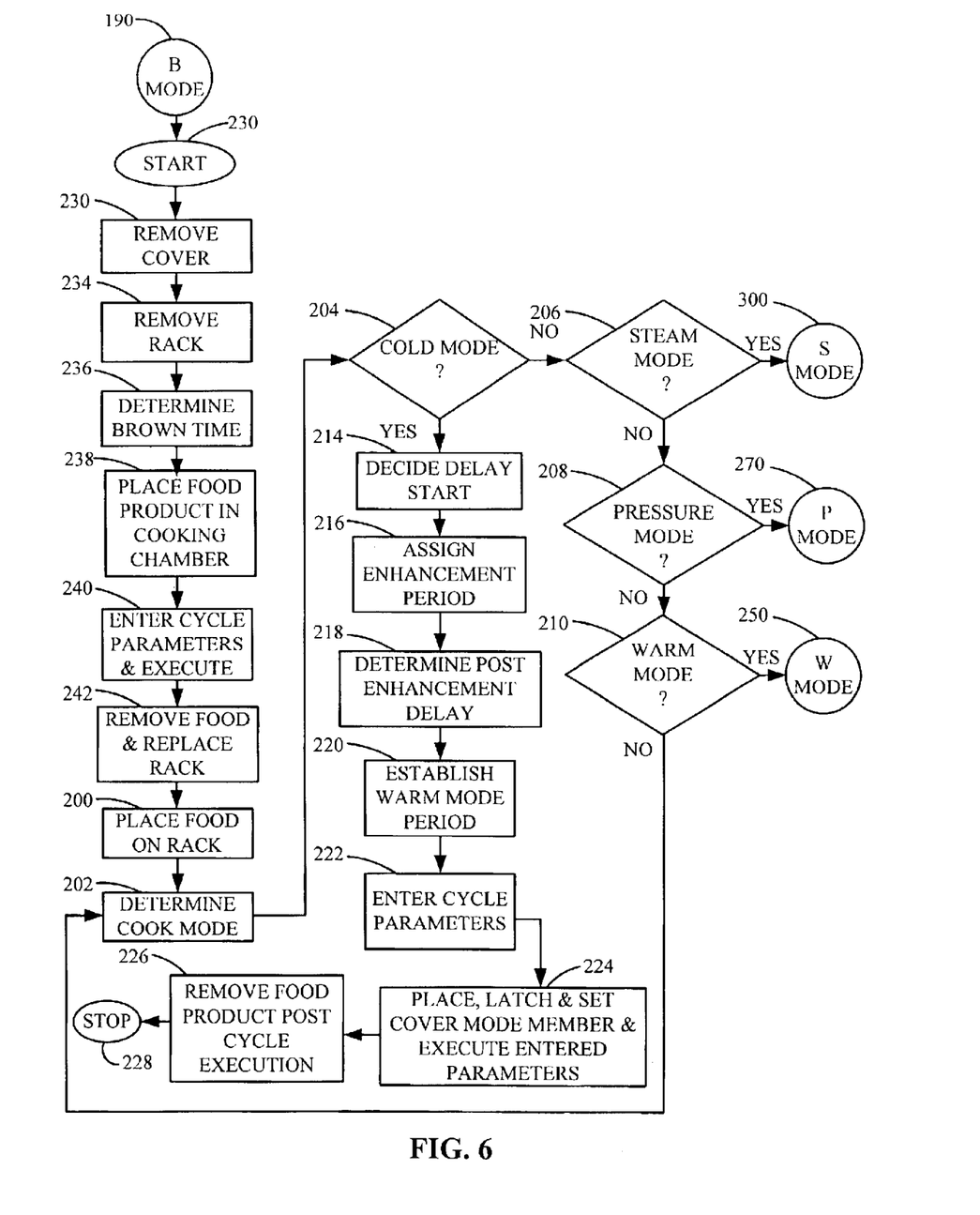
FIG. 6 is a flow chart of a method of using a browning mode of the method of FIG. 5.

If the BR is selected at process step 212, the process proceeds to flow chart 190 (to be covered during the discussion of FIG. 6). If the WM is selected at process step 210, the process proceeds to flow chart 250 (to be covered during the discussion of FIG. 7). If the PM is selected at process step 208, the process proceeds to flow chart 270 (to be covered during the discussion of FIG. 8). If the SM is selected at process step 206, the process proceeds to flow chart 300 (to be covered during the discussion of FIG. 9). If the CM is selected at process step 204, the process proceeds to process step 214.

At process step 214, a mode selection switch (such as MSS 120) of the mode identification template (such as 124) of a control panel (such as 116) is sequentially activated until the status indicator (such as LEDs 122) of a status identification template (such as 126) associated with a stop mode (Stop) illuminates. Upon illumination, an alternate MSS, assigned for selection between a flavor enhancement mode (FE) and a delay preparation mode (DM) is sequentially activated until a delay status LED illuminates. Upon illumination of the delay status LED, one of two MSSs assigned for preparation mode time entry (such as Up or Down MSS) is activated until a desired preparation mode time appears on the numeric display (such as 118), in this case a delay preparation mode time.

It is noted that, if no time is programmed to the control panel, no delay will be entered into an operational code executed by a controller (such as 128) of the food preparation device, and hence no delay will occur during execution of preparation cycle.

At process step 216, the same MSS associated with the DM is sequentially activated until a cold status LED illuminates. Upon illumination of the cold status LED, the same MSS pair used for setting the delay time are used to assign a CM enhancement period. At process step 218, a determination is made and an appropriate time entered for a desired delay period following the FE-CM period.

For selected food types (such as nuts), a WM period may be desired following either the post delay period or the FE-CM period. If a WM period is desired, at process step 220 the user proceeds along the same lines as described hereinabove with the programming of the WM period. At process step 222, the controller assimilates the program parameters into the operational code to form a programmed preparation cycle.

At process step 224, a cover (such as 104) is placed atop the cooking chamber, latched into position and a mode regulation member (such as 108) is set to a closed position (such as pressure) and the controller proceeds to execute the programmed preparation cycle following illumination of a start status LED responsive to an activation of an associated MSS by the user. At the conclusion of process step 224, the process continues to process step 226 where the food product is removed from the food preparation device, at which time the process concludes at stop step 228.

The flow chart of FIG. 6 depicts the BR process 190. It will be noted that the process steps following process step 242 are substantially similar to the process steps discussed during the discussion of FIG. 5, as such only the process steps commencing at process step 230 and concluding at process step 242 will be discussed.

The BR process commences at start step 230 and progresses to process step 232 with removal of the cover from the food preparation device. At process step 234, the modular food preparation rack is removed from the cooking chamber. At process step 236, a BR time is determined and programmed into the operational code of the controller in the same manner as described hereinabove for entry of time associated with any preparation mode.

At process step 238, a small amount of cooking oil is placed in the bottom of the cooking chamber and the food product is positioned within the cooking chamber. During the BR, the cover is left off the food preparation device to enable monitoring of the browning process by the user. At process step 240, the food preparation cycle parameters associated with the BR are assimilated into the operational code, and the controller commences execution of the programmed food preparation cycle upon activation of the start MSS by the user. At process step 242, the food product and cooking oil are removed from the cooking chamber, the modular food preparation rack is reinserted into the cooking chamber, and the process may proceed as shown to process step 200 and progress as described by the discussion of FIG. 5 hereinabove.

Figure 7:
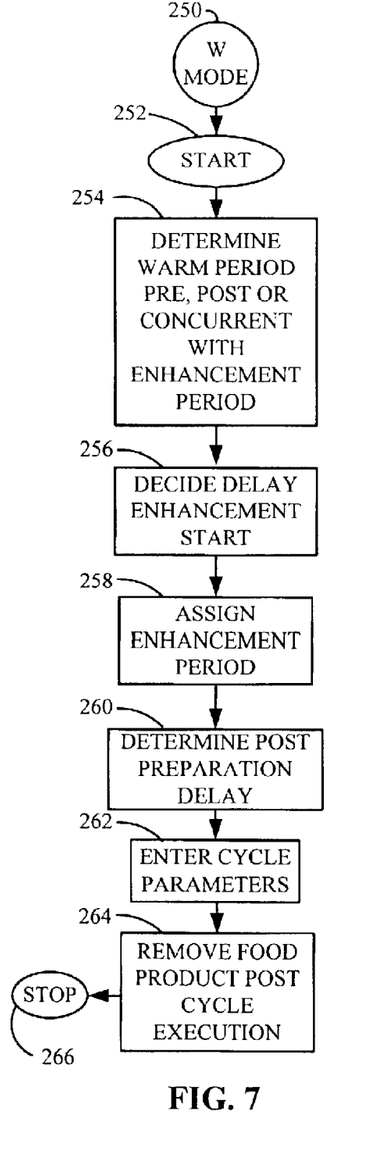
FIG. 7 is a flow chart of a method of using a warming mode of the method of FIG. 5.

FIG. 7 shows the flow chart 250 depicting process steps associated with the WM operation of the food preparation device. The WM process commences at start step 252 and continues at process step 254 with the determination of a WM time, a decision whether or not the food preparation cycle will include a FE, and if so whether the FE will proceed, follow or occur in conjunction with the WM.

If the determination is made that a FE will be included in the food preparation cycle, but activated subsequent to the conclusion of the WM, the parameters associated with the WM will be entered, followed by entry of DT parameters into the operational code at process step 256. At process step

258 the parameters associated with the FE are entered into the operational code.

If however, the FE is to precede the WM, parameters for a CM will be programmed into the operational code prior to entry of the parameters associated with the WM. It is noted that, a DT is inserted between the FE and the WM when either the FE precedes the WM, or is subsequent to the WM.

If the FE is to occur subsequent to the WM, parameters associated with the WM are programmed into the operational code, followed by the programming of DT parameters, and then the parameters associative with the FE are programmed into the operational code. For food preparation cycle's utilizing the WM in conjunction with the FE, no DT is inserted between the WM and the FE.

At process step 260, a decision is made as to whether or not a delay period should be inserted following either the WM and/or the FE, if elected. If a delay period is desired, the parameters associated with the desired DT are programmed into the operational code and the process proceeds to process step 262. At process step 262, the food preparation cycle parameters associated with the WM based food preparation cycle are assimilated into the operational code and executed by the controller.

Upon completion of the food preparation cycle, the controller signals completion of the cycle (in a preferred embodiment by activating a beeper [not separately shown] supported by the control panel), and the food product is removed from the cooking chamber at process step 264. The WM process 250 concludes at stop step 266.

Figure 8:
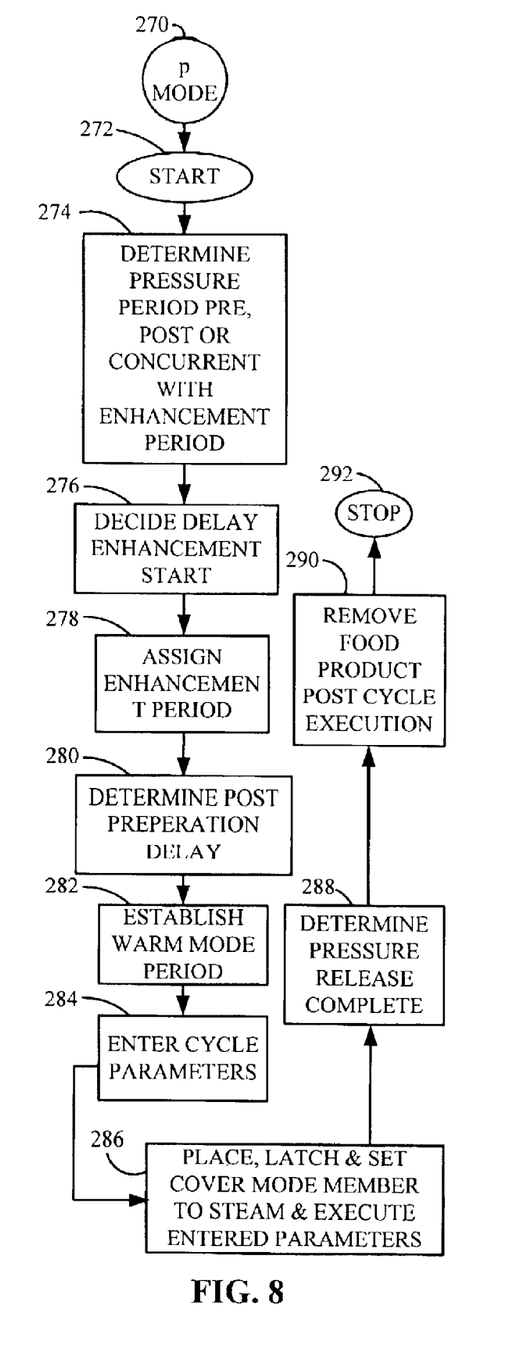
FIG. 8 is a flow chart of a method of using a pressure mode of the method of FIG. 5.

FIG. 8 shows the flow chart 270, which depicts the process associated with the PM. The PM process commences at start step 272 and continues at process step 274 with the determination of a PM time, a decision whether or not the food preparation cycle will include a FE, and if so whether the FE will proceed, follow or occur in conjunction with the PM is made. A decision is also made whether or not a WM will be included in the food preparation cycle. If neither the FE nor the WM are to be included in the food preparation cycle, the process proceeds to process step 284 with entry of the food preparation cycle parameters into the operational code.

If the determination is made that a FE will be included in the food preparation cycle, but will be activated subsequent to the conclusion of the PM, the parameters associated with the PM will be entered, followed by entry of DT parameters into the operational code at process step 276. At process step 278 the parameters associated with the FE are entered into the operational code.

If however, the FE is to precede the PM, parameters for a CM will be programmed into the operational code prior to entry of the parameters associated with the PM. It is noted that, a DT is inserted between the FE and the PM when either the FE precedes the PM, or is subsequent to the PM.

If the FE is to occur subsequent to the PM, parameters associated with the PM are programmed into the operational code, followed by the programming of DT parameters, and then followed by entry of the parameters associated with the FE are programmed into the operational code. For food preparation cycle's utilizing the PM in conjunction with the FE, no DT is inserted between the PM and the FE. Keeping in mind, as discussed hereinabove, the FE time may not exceed the PM time.

At process step 280, a decision is made as to whether or not a delay period should be inserted following either the PM and/or the FE, if elected. If a delay period is desired, the parameters associated with the desired DT are programmed into the operational code and the process proceeds to process step 282. At process step 282, a determination is made as to whether or not a WM will be included in the food preparation cycle. If a WM is to be included, the parameters associated with the WM are programmed into the operational code.

At process step 284, the food preparation cycle parameters associated with the SM based food preparation cycle are assimilated into the operational code for execution by the controller. At process step 286, the cover is placed atop and latched to the cooking chamber, the mode regulation member is set to the closed position ("Pressure") and the controller commences execution of the programmed food preparation cycle upon activation of the MSS associated with the start LED.

Upon completion of the food preparation cycle, the PM process 270 continues with process step 288. At process step 288, the controller signals completion of the cycle (in a preferred embodiment by activating a beeper [not separately shown] supported by the control panel), the mode regulation is then placed in the open position ("Steam"), a pressure present member (such as 110) is checked to determine the pressure within the cooking chamber has subsided to a point that the cover may be removed. If the pressure present member is located in a raise position, pressure within the cooking chamber has not subsided sufficiently for removal of the cover. However, if the pressure present member is located in a lowered position, pressure within the cooking chamber has sufficiently subsided to accommodate removal of the cover.

Following removal of the cover from the food preparation device, the food product is removed from the cooking chamber at process step 290. The PM process 270 concludes at stop step 292.

Figure 9:
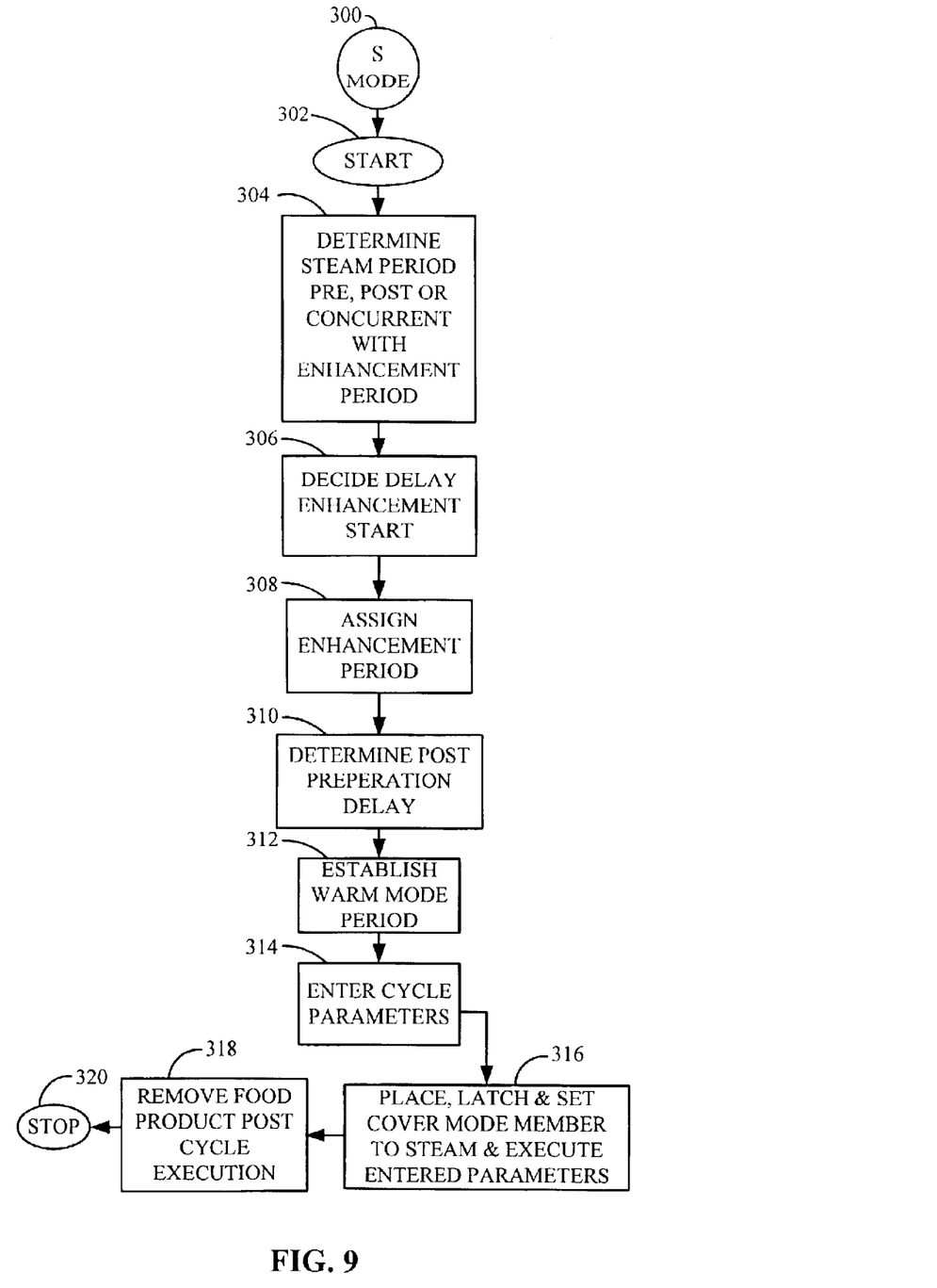
FIG. 9 is a flow chart of a method of using a steam mode of the method of FIG. 5.

FIG. 9 shows the flow chart 300, which depicts the process associated with the SM. The SM process commences at start step 302 and continues at process step 304 with the determination of a SM time, a decision is made whether or not the food preparation cycle will include a FE, and if so whether the FE will proceed, follow or occur in conjunction with the SM. A decision is also made whether or not a WM will be included in the food preparation cycle. If neither the FE nor the WM are to be included in the food preparation cycle, the process proceeds to process step 314 with entry of the food preparation cycle parameters into the operational code.

If the determination is made that a FE will be included in the food preparation cycle, but will be activated subsequent to the conclusion of the SM, the parameters associated with the SM will be entered, followed by entry of DT parameters into the operational code at process step 306. At process step 308 the parameters associated with the FE are entered into the operational code.

If however, the FE is to precede the SM, parameters for a CM will be programmed into the operational code prior to entry of the parameters associated with the SM. It is noted that, a DT is inserted between the FE and the SM when either the FE precedes the SM, or is subsequent to the SM.

If the FE is to occur subsequent to the SM, parameters associated with the SM are programmed into the operational code, followed by programming of the DT parameters, and then the parameters associated with the FE are programmed into the operational code. For food preparation cycle's utilizing the SM in conjunction with the FE, no DT is inserted between the SM and the FE. As discussed hereinabove, the FE time may not exceed the SM time.

At process step 310, a decision is made as to whether or not a delay period should be inserted following either the SM and/or the FE, if elected. If a delay period is desired, the parameters associated with the desired DT are programmed into the operational code and the process proceeds to process step 312. At process step 312, a determination is made as to whether or not a WM will be included in the food preparation cycle. If a WM is to be included, the parameters associated with the WM are programmed into the operational code.

At process step 314, the food preparation cycle parameters associated with the SM based food preparation cycle are assimilated into the operational code for execution by the controller. At process step 316, the cover is placed atop and latched to the cooking chamber, the mode regulation member is set to the open position ("Steam") and the controller commences execution of the programmed food preparation cycle upon activation of the MSS associated with the start LED.

Upon completion of the food preparation cycle, the controller signals completion of the cycle (in a preferred embodiment by activating a beeper [not separately shown] supported by the control panel), and the food product is removed from the cooking chamber at process step 318. The SM process 300 concludes at stop step 320.

Accordingly, embodiments of the present invention are generally directed to a combination (such as 100) for use in preparation of a food product and a method (such as 180) of using the combination. The combination includes a housing (such as 112) supporting a cooking chamber (such as 102), which communicates with a flavor enhancement chamber (such as 130). The cooking chamber and the flavor enhancement chamber are selectively controlled independently by an automated controller (such as 128) during execution of a food preparation cycle.

In preparing a food product using the combination, a user provides the food product for preparation (as shown by step 184), places a flavor enhancement substance within the flavor enhancement chamber (as shown by step 192), arranges the food product on a food support member (such as 132, and as shown by step 200), and position the food support member within the cooking chamber (as shown by step 198).

With the food positioned within the combination, the user selects a preparation mode for operation of the cooking chamber (as shown by step 202), assigns a flavor enhancement period independent from the preparation mode (as shown by step 216) for an impregnation of the food product with a flavor enhancement, generates the flavor enhancement through an activation of the flavor enhancement substance and prepares the food product by cycling through the preparation mode (as shown by step 224).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A food preparation device comprising:
   a housing;
   a cooking chamber confined by the housing;
   a flavor enhancement chamber communicating with the cooking chamber; and
   an automated controller selectively controlling an operating mode of the flavor enhancement chamber independently from an operation mode of the cooking chamber.

2. The device of claim 1 further comprising a control panel supported by the housing communicating with the automated controller, the control panel determining an operating mode for the cooking chamber by relaying a cooking chamber operating instruction to the automated controller, in which the automated controller is a programmable electronic controller.

3. The device of claim 1 further comprising a control panel supported by the housing communicating with the automated controller determining an operating mode for the flavor enhancement chamber by relaying a flavor enhancement chamber operating instruction to the automated controller, in which the automated controller is a programmable electronic controller.

4. The device of claim 1 further comprising a control panel supported by the housing communicating with the automated controller, the control panel determining an operating mode for the cooking chamber by relaying an operating instruction to the automated controller, the control panel further determining an operating mode for the flavor enhancement chamber by relaying an operating instruction to the automated controller, in which the automated controller is a programmable electronic controller.

5. The device of claim 1 further comprising a cover communicating with the cooking chamber sustaining an environment of the cooking chamber.

6. The device of claim 1 further comprising an external shell adjacent the housing, the external shell providing a thermal insulation cavity circumventing the housing.

7. The device of claim 1 further comprising a food preparation support member communicating with the cooking chamber, the cooking chamber applying a level of energy to a food product, the food preparation support member supporting the food product during the application of the level of energy to the food product.

8. The device of claim 1 further comprising a food preparation support member communicating with the cooking chamber, the food support member supporting a food product, the flavor enhancement chamber generating a flavor enhancement, the flavor enhancement absorbed by the food product.

9. The device of claim 1 further comprising a food preparation support member communicating with the cooking chamber, the food support member supporting a food product, the flavor enhancement chamber generating a flavor enhancement, the flavor enhancement absorbed by the food product, the cooking chamber applying the level of energy to the food product concurrent with the generation of the flavor enhancement by the flavor enhancement chamber.

10. The device of claim 1, in which the cooking chamber comprises an energy generation device applying a level of energy to a food product, the level of energy applied to the food product preparing the food product.

11. The device of claim 1, in which the flavor enhancement chamber comprises an energy generation device applying a level of energy to a flavor enhancement substance, the energized flavor enhancement substance providing a flavor enhancement, the flavor enhancement absorbed by a food product, the absorption of the flavor enhancement preparing the food product.

12. The device of claim 1, in which the flavor enhancement chamber comprises a first energy generation device applying a level of energy to a flavor enhancement substance, the level of energy applied to the flavor enhancement substance providing a flavor enhancement, the flavor enhancement absorbed by a food product, the absorption of the flavor enhancement preparing the food product, and in which the cooking chamber comprises a second energy generation device applying a level of energy to the food product, the level of energy applied to the food product further preparing the food product.

13. The device of claim 5, in which the cover comprises a mode regulation member regulating the environment of the cooking chamber.

14. The device of claim 1 further comprising:
a control panel supported by the housing communicating with the automated controller, the control panel determining an operating mode for the cooking chamber by relaying an operating instruction to the automated controller, the control panel further determining an operating mode for the flavor enhancement chamber by relaying an operating instruction to the automated controller, in which the automated controller is a programmable electronic controller; a cover communicating with the cooking chamber sustaining an environment of the cooking chamber, the cover comprising:
    a mode regulation member regulating the environment of the cooking chamber; and
    a latching member communicating with the cooking chamber securing the cover adjacent the cooking chamber;
an external shell adjacent the housing providing a thermal insulation cavity circumventing the housing;
a first energy generation device applying a level of energy to a flavor enhancement substance, the energized flavor enhancement substance providing a flavor enhancement, the flavor enhancement absorbed by a food product, the absorption of the flavor enhancement preparing the food product;
a second energy generation device applying a level of energy to the food product, the level of energy applied to the food product further preparing the food product; and
a food preparation support member communicating with the cooking chamber, the food preparation support member supporting the food product during the application of the level of energy by the first energy generation device, in which the application of the level of energy by the first energy generation device occurs non-concurrently with the energy applied to the food product by the second energy generating device.

15. A method for enhancing flavor of a food product by steps comprising:
providing the food product in a pre-preparation state;
placing a flavor enhancement substance within a flavor enhancement chamber, the flavor enhancement chamber communicating with a cooking chamber;
arranging the food product on a food support member communicating with the cooking chamber;
selecting a preparation mode for operation of the cooking chamber;
assigning a flavor enhancement time period independent from the preparation mode time period for an impregnation of the food product with a flavor enhancement;
generating the flavor enhancement through an activation of the flavor enhancement substance; and
preparing the food product by cycling through the preparation mode.

16. The method of claim 15, in which the preparation mode is selected by steps comprising:

choosing the preparation mode from a group comprising a steam mode, a pressure mode, a warm mode and a cold mode;
determining a period of exposure of the food product to the chosen preparation mode;
keying into a control panel both the chosen preparation mode and the period of exposure of the food product to the chosen preparation mode; and
executing both the keyed chosen preparation mode and the keyed period of exposure of the food product to the chosen preparation mode with an automated controller communicating with the control panel.

17. The method of claim 16, in which the flavor enhancement period is assigned by steps comprising:
deciding on a delay period for activation of the flavor enhancement substance;
electing a period of delay for the selected preparation mode;
ascertaining an activation period over which exposure of the food product to the generated flavor enhancement occurs;
entering into the control panel the ascertained activation period over which exposure of the food product to the generated flavor enhancement occurs, along with the decided delay period for activation of the flavor enhancement substance, in addition to the elected period of delay for the selected preparation mode;
executing the entered ascertained activation period over which exposure of the food product to the generated flavor enhancement occurs, along with the decided delay period for activation of the flavor enhancement substance, in addition to the elected period of delay for the selected preparation mode, using the automated controller communicating with the control panel; and
preparing the food product by cycling through the preparation mode.

18. The method of claim 17, in which the selected preparation mode provides a level of energy for the preparation of the food product, and in which the impregnation of the food product with a flavor enhancement is non-concurrent with the period of exposure of the food product to the provided energy of the chosen preparation mode.

19. The method of claim 17, in which the selected preparation mode provides a level of energy for the preparation of the food product, and in which the impregnation of the food product with a flavor enhancement is concurrent with the period of exposure of the food product to the provided energy of the chosen preparation mode.

20. A food product flavor enhancement combination comprising:
a cooking chamber confined by a housing;
a flavor enhancement chamber confined by the cooking chamber; and
an automated controller selectively controlling an operating mode of the flavor enhancement chamber independently from an operation mode of the cooking chamber during preparation of a food product, flavor of the food product enhanced by steps for enhancing flavor of a food product.

* * * * *